June 21, 1966 — F. TONNE — 3,257,088
PNEUMATIC TUBE PLANT
Filed April 3, 1964 — 4 Sheets-Sheet 1

Inventor:
Friedrich Tonne
By

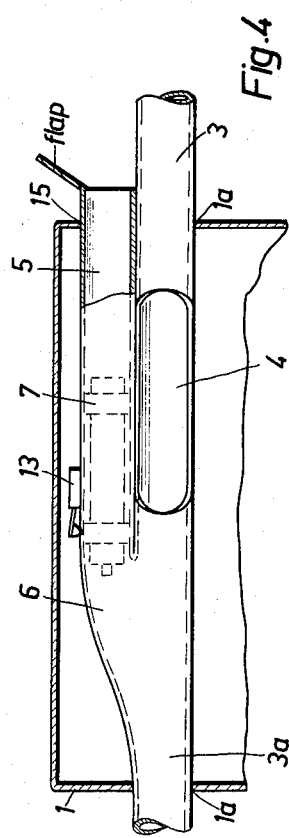
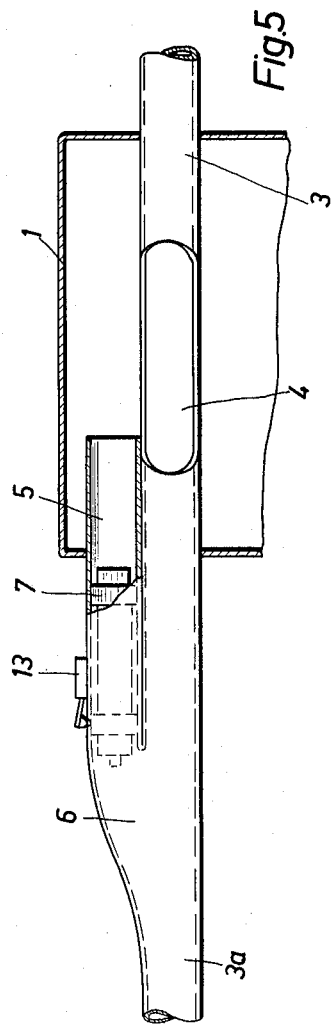

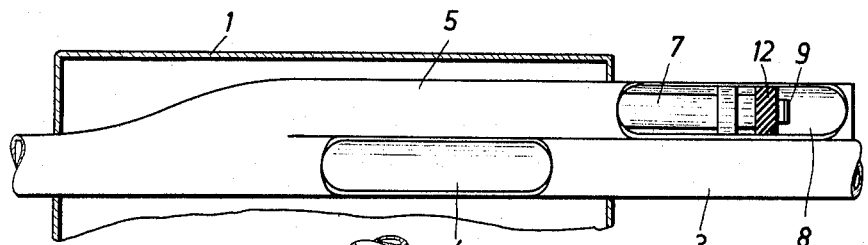
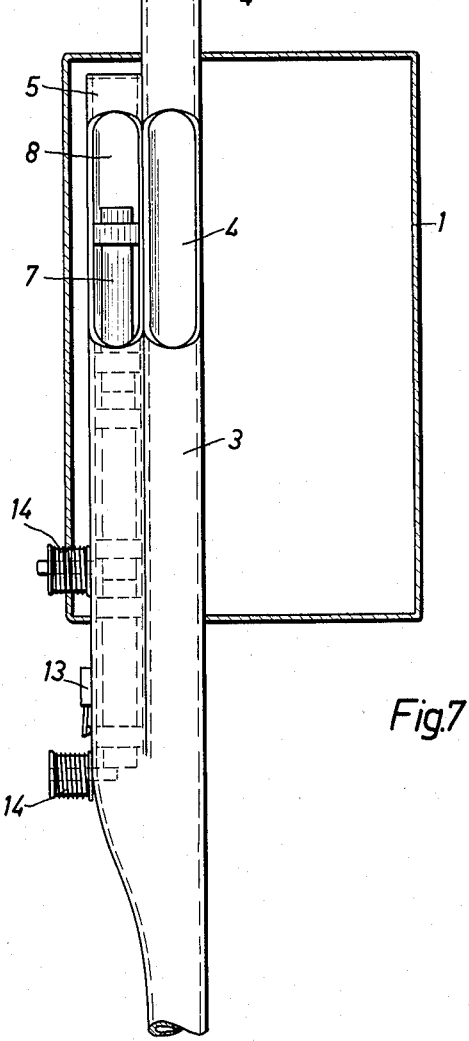

United States Patent Office 3,257,088
Patented June 21, 1966

3,257,088
PNEUMATIC TUBE PLANT
Friedrich Tonne, 9 Robert-Haug-Weg, Stuttgart, Germany
Filed Apr. 3, 1964, Ser. No. 357,217
Claims priority, application Germany, Apr. 8, 1963,
T 23,805
9 Claims. (Cl. 243—19)

The present invention relates to a pneumatic tube plant for dispatching messages and the like. More specifically, the present invention concerns a pneumatic tube plant of the above type which is provided with at least one dispatch opening for receiving tubes to be dispatched, and which is furthermore provided with airtight closure means provided for closing the dispatch opening and adapted to be provided for receiving the tube to be dispatched.

With various pneumatic tube plants of the above-mentioned type it must be assured that prior to the dispatch of tubes no other tube is present in the plant in a certain tube section. The checking in this respect causes time delays for the dispatch which time delay depends on the size of the plant and the operation thereof.

This difficulty is encountered in particular with pneumatic tube plants having dispatch and receiving stations in which the dispatch opening of the tube is located in an airtight housing while one opening in the conveying tube may be employed both for dispatching as well as for receiving tubes. With these stations, it is possible to eject one or more dispatch tubes from the conveying tube at the arrival of a dispatch tube. One or more dispatch tubes may be inserted into the conveying tube during the dispatch of said dispatch tubes. These receiving and dispatching stations are employed in pneumatic tube plants which are designed for one-directional traffic and also for two-directional traffic (reversible operation).

It is an object of the present invention to provide a pneumatic tube plant which will overcome the above-mentioned drawbacks.

It is another object of this invention to provide a pneumatic tube plant of the general type mentioned above, which will avoid the time delay above-mentioned when inserting dispatch tubes into the conveying tubes.

It is another object of this invention to provide a pneumatic tube plant in which the loading of dispatch tubes may be effected at any time while the transfer of the loaded dispatch tubes into the conveying tube system of the plant will be effected automatically whenever the conveying tube is free.

These and other objects and advantages of the invention will appear more clearly from the following specification in connection with the accompanying drawing, in which:

FIGS. 4, 5 and 6 illustrate further embodiments of the invention differing from the embodiment of FIG. 1 in that the dispatch tube discharging station is arranged partly outside the housing shown in FIG. 1.

FIG. 7 shows a further modification of a discharging station according to the present invention, in which a plurality of dispatch tubes may be stored and discharged simultaneously or individually.

Figure 1:
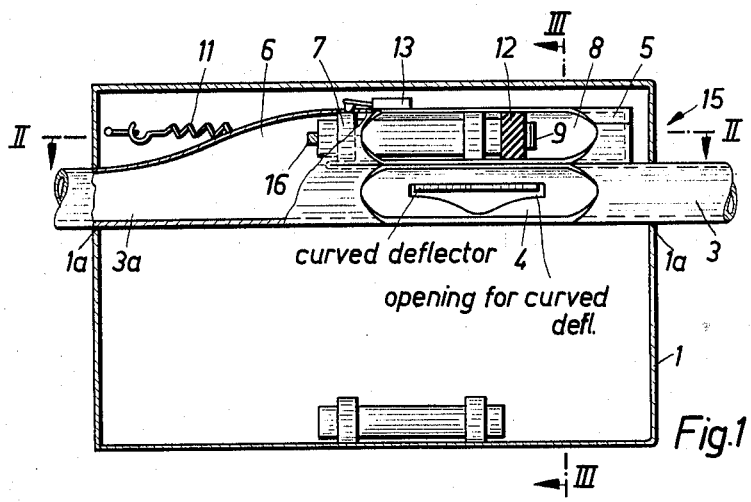
FIG. 1 illustrates a side view and partly a section of a dispatch and receiving station according to the present invention.

The present invention is characterized primarily in that the dispatch station is provided with a storage device leading into the conveying tube while between the storage device and the conveying tube there are provided movable control means which prevent the dispatch of a dispatch tube until the conveying tube is empty and then releases the dispatch tube.

Referring now to the drawing in detail, the station shown therein comprises an airtight housing 1 having an opening 2a and being provided with a door 2 adapted to be opened and tightly close said opening 2a. This door 2 may consist of transparent material so as to afford the operator a view into the conveying tube 3. The conveying tube 3 passes through openings 1a of housing 1 in an airtight manner so that no air can enter into or escape from housing 1. The conveying tube 3 has an opening 4 through which the dispatch tubes are inserted into the conveying tube. Similarly, dispatch tubes arriving at this station may be withdrawn or ejected from conveying tube 3 through said opening 4. In the last mentioned instance, an ejector or deflector of any standard type as disclosed for instance in U.S. Patent 3,053,475 may be provided.

Figure 2:
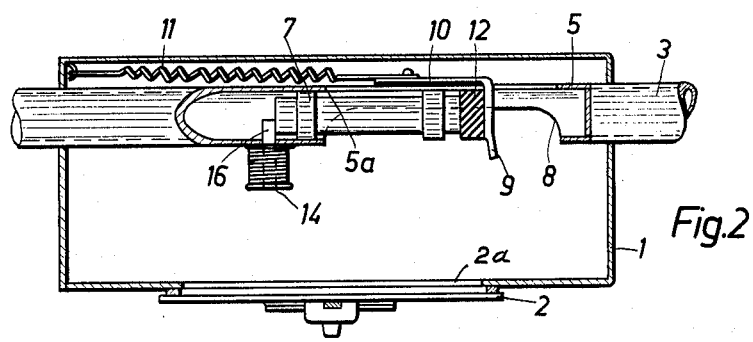
FIG. 2 represents a section taken along the line II—II of FIG. 1.
Figure 3:
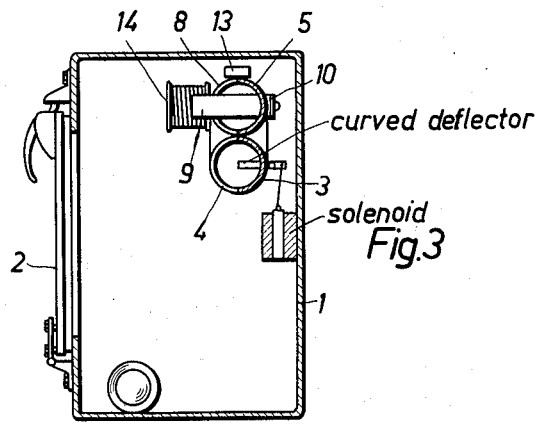
FIG. 3 is a section taken along the line III—III of FIG. 1.
Figure 8:
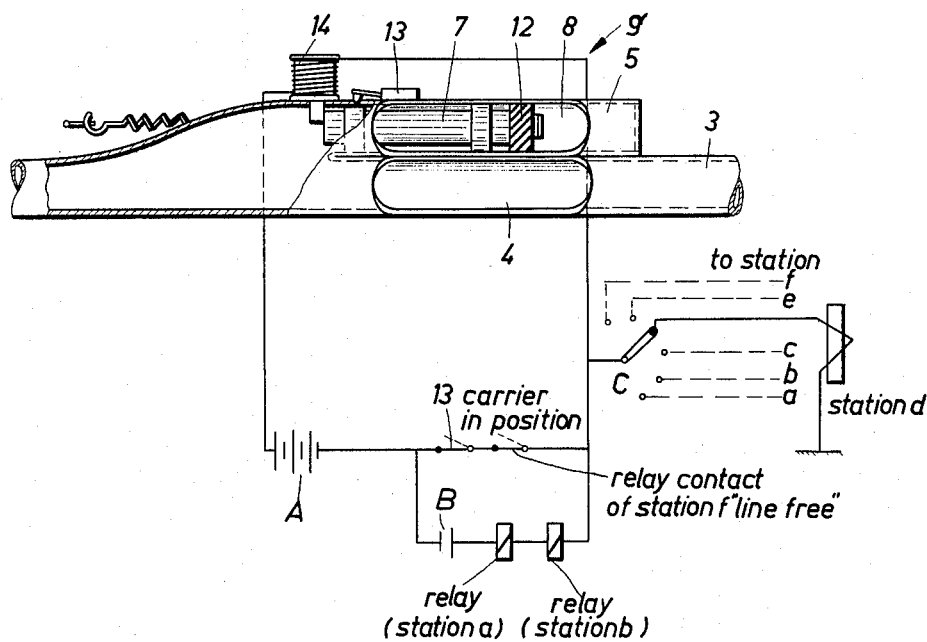
FIG. 8 illustrates a control system for use in connection with the present invention.

Within the housing 1, conveying tube 3 is provided with an additional compartment 5 which through an opening 6 communicates with tube section 3a. This compartment 5 serves for receiving a dispatch tube 7 which may be manually placed into said compartment through an opening 8 thereof. The arrangement shown in the drawing furthermore comprises a dispatch lever 9 which is slidably arranged in guiding slot 10 of compartment 5 and is under the continuous effect of a tension spring 11. When no dispatch tube is in compartment 5, the dispatch lever 9 will due to the thrust of spring 11 abut edge 5a of guiding slot 10. It will be appreciated that in this position the dispatch lever 9 and, more specifically, its sealing buffer 12 connected thereto will interrupt communication of compartment 5 with conveying tube 3 and will thus close the conveying tube 3 against outside air. It will also be appreciated that in order to be able to insert a dispatch tube into compartment 5, dispatch lever 9 has to be withdrawn from its engagement with edge 5a and to be moved into the position shown in solid lines in FIG. 2. Of course, the movement of lever 9 into its FIG. 2 position may also be effected simultaneously with the insertion of the dispatch tube by causing one end of the dispatch tube to engage and push lever 9 toward the right with regard to FIG. 2. When dispatch tube 7 has been inserted into compartment 5, it actuates a switch 13 adapted to initiate a signal of any desired type which can be observed by the operator to thereby indicate whether tube 7 has been dispatched. For instance, when a dispatch tube is inserted into compartment 5 it may close a switch which in its turn closes a lamp circuit, whereas when a dispatch tube is released from compartment 5, the said switch opens and thus also the lamp circuit. If desired, switch 13 may also actuate a control device known per se which is adapted to be placed into readiness by keys or switches of any standard type. This control device permits the dispatch tube to move over a predetermined path when switch 13 is actuated. Such a control device is advisable for pneumatic tube plants in which the path over which the dispatch tube is to be moved is not automatically controlled by the dispatch tube itself. Such control device for scanning magnets or the like provided on the dispatch tubes. For purposes of holding dispatch tube 7 in its waiting position, there is provided an armature 16 pertaining to an electromagnet 14. The electromagnet 14 is energized as soon as the said control device or another device has ascertained that the path intended for the dispatch tube in conveying tube 3 is free, in other words that no other dispatch tubes are in the respective section of the conveying tube through which the dispatch tube to be released has to move. As soon as armature 16 has been attracted by electromagnet 14, tube 7 is free to move and lever 9 will then immediately in view of the thrust of spring 11 throw dispatch tube 7 into the section 6 and thereby the section 3a of conveying tube 3. A control device of this general type is illustrated in FIG. 8. A battery A energizes the electromagnet 14 of the discharging station g shown in FIG. 8, while the circuit of the battery has arranged therein in series the contact 13 of said station and the contacts of the relays of the further stations a, b, c, d, e, and f pertaining to the dispatch tube plant, the relay contact of station f only being shown in FIG. 8. In parallel to these contacts, there is arranged a further circuit containing a battery B and the windings of the station relays. A selective switch C is branched off from the circuit common to all stations. This selective switch may be adjusted to the desired receiving station and connects the relay of the ejector of the adjusted station with the control circuit. In the particular arrangement shown in FIG. 8, the selective switch C is adjusted so as to connect the receiving station d with the control circuit.

The contacts of the station relays arranged in series are rest contacts and are therefore normally closed. If a tube is introduced into the tube section 5 of the station g, contact 13 of this station is closed. Battery A energizes the electromagnet 14 if all rest contacts of the remaining station relays a to f are closed. Battery B energizes the closed contact 13 and the rest contacts as well as the windings of the station relays, so that all rest contacts are opened for a short period of time. In this way, a tube will be prevented from being discharged from any station other than station g. Inasmuch as the electromagnet 14 has been energized for a very short period of time, the armature thereof is attracted so that the dispatch tube 7 may be injected into the conveying tube. The rest contacts of the station relays return to their respective starting positions after a predetermined period of time, so that the plant is ready to discharge further dispatch tubes.

This mechanism permits the arrangement of the dispatch and receiving station in any direction, i.e. horizontal or vertical. Thus, also a dispatch in upward direction or a movement of the dispatch tube against the air flow will be possible. The arrangement according to the invention is, therefore, suitable for two-directional traffic (reversible operation). When the conveying tube 3 within the range of the dispatch and receiving station is arranged approximately vertically, and when the dispatch tube is dispatched in a downward direction, the dispatch lever 9 will, of course, become superfluous.

For purposes of inserting the dispatch tube 7, it is not necessary to open door 2 if, in conformity with another modification of the invention illustrated in FIG. 4, the wall of housing 1 has an opening at 15, and compartment 5 extends to said opening. In this instance the said opening is provided with a closure, for instance a gate or flap.

According to still another modification of the invention, shown in FIG. 5, section 6 of compartment 5 is located entirely or partly outside the housing 1 so that merely opening 4 will be accessible from the interior of the housing. However, it is also possible (see FIG. 6) to arrange the compartment 5 outside housing 1. In this instance, the charging opening 8 would be located at least partly outside housing 1, and the seal 12 of lever 9 would in rest position of lever 9 seal the opening of tube 5 toward the outside.

According to still another modification of the invention, compartment 5 may also be so designed as to be able to receive a plurality of dispatch tubes arranged alongside or one behind each other, as illustrated in FIG. 7. The thus stored dispatch tubes may either simultaneously or, for instance when providing a plurality of electromagnets 14, selectively be dispatched one after the other.

Referring to FIG. 7, in the arrangement shown therein the lowermost dispatch tube (with regard to the drawing) rests against a locking means formed by the armature of an electromagnet 14. A further magnet 14 is located within the range of the rearward end of said tube. In the position shown in FIG. 7, the armature of the second electromagnet 14 is held within the coil so that it is ineffective. If the armature of the first-mentioned electromagnet 14 is attracted, all three dispatch tubes 7 in compartment 5 are released and dispatched. However, if it is desired that only the lowermost dispatch tube 7 be released, the second electromagnet 14 is actuated in such a way that its armature serves as a stop for the two uppermost tubes 7, i.e., is interposed between the two lowermost tubes. The armature of this last-mentioned electromagnet 14 thus holds the two uppermost tubes so that upon actuation of the lowermost electromagnet 14 only the lowermost tube is released. When this tube has left compartment 5, the lowermost magnet 14 is again actuated so that its armature obstructs the passage of the other dispatch tubes. Subsequently, the second electromagnet 14 is actuated, i.e., its armature is attracted so that the two dispatch tubes 7 still remaining in the compartment 5 advance to the lowermost stop means. If it is intended to dispatch these two tubes simultaneously, the uppermost magnet 14 is no longer actuated. However, if it is desired to dispatch only the lowermost dispatch tube 7, the uppermost electromagnet 14 is actuated in such a way that its armature acts as a stop for the last dispatch tube. This control makes it possible to dispatch either one single tube only or simultaneously all tubes present in compartment 5.

An arrangement for a selective dispatch of dispatch tubes stored in compartment 5 is advantageous particularly for pneumatic tube plants with automatic control of the dispatch path. As mentioned above, with plants of this type, the dispatch tubes are provided with means, as for instance magnets or contacts, which are scanned or sensed and in this way automatically determine the path for the respective dispatch tube.

It is, of course, to be understood that the present invention is, by no means, limited to the particular constructions shown in the drawing but also comprises any modifications within the scope of the appended claims.

What I claim is:

1. A dispatch station for a pneumatic tube plant, which includes: a conveying tube section adapted to be connected to a conveying tube system of a pneumatic tube plant, a dispatch tube-receiving compartment having a discharge opening communicating with said conveying tube section, said compartment being adapted to release a dispatch tube through said dispatch opening to said conveying tube section, closure means arranged within said compartment and movable in longitudinal direction thereof from an ineffective position in which it relieves said opening to an effective position in which it closes said opening, spring-urged lever means continuously urging said closure means into its effective position but yieldable in response to the movement of said closure means into its ineffective position, and blocking means normally extending into the path of movement of a dispatch tube from said compartment to said conveying tube section to thereby prevent a dispatch tube from passing from said compartment to said conveying tube section, said blocking means also being adapted to be withdrawn from its blocking position to thereby permit free movement of a dispatch tube inserted into said compartment between said closure means and said opening to pass through the latter into said conveying tube section.

2. A dispatch station according to claim 1, in which said compartment has a longitudinal slot, and in which said spring-urged lever means is guided in said slot.

3. An arrangement according to claim 1, which includes electromagnetic means operatively connected to said blocking means and operable to change from one position to another position in response to the energization of said electromagnetic means.

4. A dispatch station for a pneumatic tube plant, which includes: a housing, a conveying tube section arranged in said housing and adapted to be connected to a conveying discharge system of a pneumatic tube plant, said housing surrounding said conveying tube section therein in an air-tight manner, said housing having an opening, cover means for selectively closing said opening in an airtight manner and also being adapted to be opened for permitting access to the interior of said housing, a dispatch tube-receiving compartment arranged within said housing and having a first opening for receiving a dispatch tube and also having a second opening establishing communication between said compartment and said conveying tube section for permitting the passage of a dispatch tube from said compartment into said conveying tube section, and control means operatively connected to said compartment for controlling the release of a dispatch tube from said compartment into said conveying tube section, said conveying tube section within said housing being provided with an opening communicating with said first opening and leading into said housing for permitting the passage of a dispatch tube therethrough.

5. A dispatch station according to claim 4, which includes: switch means associated with said dispatch tube receiving compartment and operable by a dispatch tube in said compartment for initiating a control action of said conveying tube system, and control means operatively connected to said compartment for controlling the release of a dispatch tube from said compartment into said conveying tube section.

6. An arrangement according to claim 5, which includes path selecting means for guiding a dispatch tube from the dispatch tube-receiving compartment to different paths, and in which said switch means is operable to control said path selecting means.

7. A dispatch station according to claim 4, which includes: control means operatively connected to said compartment for controlling the release of a dispatch tube from said compartment into said conveying tube section, said control means including blocking means normally extending into the path of movement of a dispatch tube for preventing a dispatch tube from passing from said compartment to said conveying tube section, said control means also including electromagnetic means for controlling said blocking means and also including switch means operable by the dispatch tube in said compartment for controlling said electromagnetic means.

8. An arrangement according to claim 4, in which said conveying tube section widens adjacent one end of said dispatch tube receiving compartment and merges therewith.

9. A dispatch station for a pneumatic tube plant, which includes: a conveying tube section adapted to be connected to a conveying tube system of a pneumatic tube plant, a plurality of dispatch tube-receiving compartment means respectively having a dispatch opening communicating with said conveying tube section, said compartment means being adapted to release a dispatch tube to said conveying tube section through the respective opening pertaining thereto, a plurality of closure means respectively arranged within said compartment means and movable in longitudinal direction thereof from an ineffective position in which it relieves the respective opening to an effective position in which it closes the respective opening, a plurality of spring-urged lever means respectively continuously urging said closure means into the effective position thereof but yieldable in response to the movement of said closure means into the ineffective position thereof, and a plurality of blocking means respectively operatively connected to said compartment means and normally extending into the path of movement of a dispatch tube from the respective compartment means to said conveying tube section to thereby prevent a dispatch tube from passing from the respective compartment means to said conveying tube section, each of said blocking means also being adapted to be withdrawn from the respective blocking position thereof to thereby permit free movement of a dispatch tube inserted into the respective compartment means between the respective closure means and the respective opening to pass through the latter into said conveying tube section.

References Cited by the Examiner

UNITED STATES PATENTS

| 962,797 | 6/1910 | Stoddard | 243—25 |
|---|---|---|---|
| 2,241,917 | 5/1941 | Mehlis | 243—16 |
| 2,710,728 | 6/1955 | Halpern | 243—28 |
| 3,055,611 | 9/1962 | Stout | 243—16 |

HUGO O. SCHULZ, *Primary Examiner.*

A. H. NIELSEN, *Assistant Examiner.*